United States Patent
Mayya et al.

(10) Patent No.: US 10,523,539 B2
(45) Date of Patent: Dec. 31, 2019

(54) METHOD AND SYSTEM OF RESILIENCY IN CLOUD-DELIVERED SD-WAN

(71) Applicant: Nicira, Inc., Palo Alto, CA (US)

(72) Inventors: Ajit Ramachandra Mayya, Saratoga, CA (US); Parag Pritam Thakore, Los Gatos, CA (US); Stephen Craig Connors, San Jose, CA (US); Steven Michael Woo, Los Altos, CA (US); Sunil Mukundan, Chennai (IN); Thomas Harold Speeter, San Martin, CA (US)

(73) Assignee: NICIRA, INC., Palo Alto, CA (US)

( * ) Notice: Subject to any disclaimer, the term of this patent is extended or adjusted under 35 U.S.C. 154(b) by 34 days.

(21) Appl. No.: 15/701,115

(22) Filed: Sep. 11, 2017

(65) Prior Publication Data

US 2018/0375824 A1    Dec. 27, 2018

Related U.S. Application Data

(60) Provisional application No. 62/523,477, filed on Jun. 22, 2017.

(51) Int. Cl.
*H04L 12/26* (2006.01)
*H04L 12/66* (2006.01)
(Continued)

(52) U.S. Cl.
CPC ........ *H04L 43/045* (2013.01); *H04L 12/2856* (2013.01); *H04L 12/66* (2013.01);
(Continued)

(58) Field of Classification Search
CPC . H04L 41/5038; H04L 43/10; H04L 12/2856; H04L 12/2898; H04L 45/123;
(Continued)

(56) References Cited

U.S. PATENT DOCUMENTS

| 7,003,481 B2 | 2/2006 | Banka et al. |
| 8,111,692 B2 | 2/2012 | Ray |
(Continued)

FOREIGN PATENT DOCUMENTS

| EP | 1912381 A1 | 4/2008 |
| EP | 3041178 A1 | 7/2016 |
(Continued)

OTHER PUBLICATIONS

Petition for Post-Grant Review of U.S. Pat. No. 9,722,815, filed May 1, 2018, 106 pages.
(Continued)

*Primary Examiner* — Kyung H Shin
(74) *Attorney, Agent, or Firm* — Adeli LLP

(57) ABSTRACT

In one aspect, a computerized method includes the step of providing process monitor in a Gateway. The method includes the step of, with the process monitor, launching a Gateway. Daemon (GWD). The GWD runs a GWD process that implements a Network Address Translation (NAT) process. The NAT process includes receiving a set of data packets from one or more Edge devices and forwarding the set of data packets to a public Internet. The method includes the step of receiving another set of data packets from the public Internet and forwarding the other set of data packets to the one or more Edge devices. The method includes the step of launching a Network Address Translation daemon (NATD). The method includes the step of detecting that the GWD process is interrupted; moving the NAT process to the NATD.

18 Claims, 6 Drawing Sheets

(51) Int. Cl.
*H04L 29/12* (2006.01)
*H04L 12/24* (2006.01)
*H04L 12/729* (2013.01)
*H04L 12/721* (2013.01)
*H04L 12/707* (2013.01)
*H04L 12/725* (2013.01)
*H04L 12/28* (2006.01)

(52) U.S. Cl.
CPC ........ *H04L 41/5032* (2013.01); *H04L 45/123* (2013.01); *H04L 45/124* (2013.01); *H04L 45/125* (2013.01); *H04L 45/22* (2013.01); *H04L 45/302* (2013.01); *H04L 45/70* (2013.01); *H04L 61/25* (2013.01); *H04L 12/2854* (2013.01); *H04L 43/087* (2013.01); *H04L 43/0829* (2013.01); *H04L 43/16* (2013.01)

(58) Field of Classification Search
CPC ..... H04L 45/124; H04L 45/125; H04L 45/70; H04L 12/2854; G06F 16/178; G06F 11/1456
See application file for complete search history.

(56) References Cited

U.S. PATENT DOCUMENTS

| | | | |
|---|---|---|---|
| 8,228,928 | B2 | 7/2012 | Parandekar et al. |
| 8,243,589 | B1 | 8/2012 | Trost et al. |
| 8,259,566 | B2 | 9/2012 | Chen et al. |
| 8,566,452 | B1 | 10/2013 | Goodwin, III et al. |
| 8,724,456 | B1 | 5/2014 | Hong et al. |
| 8,964,548 | B1 | 2/2015 | Keralapura et al. |
| 9,071,607 | B2 | 6/2015 | Twitchell, Jr. |
| 9,154,327 | B1 | 10/2015 | Marino et al. |
| 9,306,949 | B1 | 4/2016 | Richard et al. |
| 9,336,040 | B2 | 5/2016 | Dong et al. |
| 9,354,983 | B1 * | 5/2016 | Yenamandra ......... G06F 16/178 |
| 9,432,245 | B1 | 8/2016 | Sorenson et al. |
| 9,450,817 | B1 | 9/2016 | Bahadur et al. |
| 9,450,852 | B1 | 9/2016 | Chen et al. |
| 9,525,564 | B2 | 12/2016 | Lee |
| 9,665,432 | B2 | 5/2017 | Kruse et al. |
| 9,715,401 | B2 | 7/2017 | Devine et al. |
| 9,722,815 | B2 | 8/2017 | Mukundan et al. |
| 9,787,559 | B1 * | 10/2017 | Schroeder ........... H04L 41/5038 |
| 10,135,789 | B2 | 11/2018 | Mayya et al. |
| 10,178,032 | B1 | 1/2019 | Freitas |
| 10,187,289 | B1 | 1/2019 | Chen et al. |
| 10,229,017 | B1 | 3/2019 | Zou et al. |
| 10,326,830 | B1 | 6/2019 | Singh |
| 10,348,767 | B1 | 7/2019 | Lee et al. |
| 2002/0198840 | A1 | 12/2002 | Banka et al. |
| 2003/0112808 | A1 | 6/2003 | Solomon |
| 2003/0161313 | A1 * | 8/2003 | Jinmei ................ H04L 12/2856 370/392 |
| 2003/0202506 | A1 | 10/2003 | Perkins et al. |
| 2003/0219030 | A1 | 11/2003 | Gubbi |
| 2004/0059831 | A1 | 3/2004 | Chu et al. |
| 2004/0068668 | A1 | 4/2004 | Lor et al. |
| 2005/0078690 | A1 | 4/2005 | DeLangis |
| 2006/0114838 | A1 | 6/2006 | Mandavilli et al. |
| 2006/0171365 | A1 | 8/2006 | Borella |
| 2006/0182034 | A1 | 8/2006 | Klinker et al. |
| 2006/0193247 | A1 | 8/2006 | Naseh et al. |
| 2007/0064604 | A1 | 3/2007 | Chen et al. |
| 2007/0091794 | A1 | 4/2007 | Filsfils et al. |
| 2007/0121486 | A1 | 5/2007 | Guichard et al. |
| 2007/0177511 | A1 | 8/2007 | Das et al. |
| 2007/0260746 | A1 | 11/2007 | Mirtorabi et al. |
| 2008/0049621 | A1 | 2/2008 | McGuire et al. |
| 2008/0080509 | A1 | 4/2008 | Khanna et al. |
| 2008/0095187 | A1 | 4/2008 | Jung et al. |
| 2008/0219276 | A1 | 9/2008 | Shah et al. |
| 2009/0154463 | A1 | 6/2009 | Hines et al. |
| 2009/0247204 | A1 | 10/2009 | Sennett et al. |
| 2010/0008361 | A1 | 1/2010 | Guichard et al. |
| 2010/0088440 | A1 | 4/2010 | Banks et al. |
| 2010/0118727 | A1 | 5/2010 | Draves et al. |
| 2010/0332657 | A1 | 12/2010 | Elyashev et al. |
| 2011/0075674 | A1 | 3/2011 | Li et al. |
| 2011/0110370 | A1 | 5/2011 | Moreno et al. |
| 2011/0153909 | A1 | 6/2011 | Dong |
| 2012/0008630 | A1 | 1/2012 | Ould-Brahim |
| 2012/0027013 | A1 | 2/2012 | Napierala |
| 2012/0157068 | A1 | 6/2012 | Eichen et al. |
| 2012/0173919 | A1 | 7/2012 | Patel et al. |
| 2012/0221955 | A1 | 8/2012 | Raleigh et al. |
| 2012/0250682 | A1 | 10/2012 | Vincent et al. |
| 2012/0250686 | A1 | 10/2012 | Vincent et al. |
| 2012/0300615 | A1 | 11/2012 | Kempf et al. |
| 2012/0317291 | A1 | 12/2012 | Wolfe |
| 2013/0019005 | A1 | 1/2013 | Hui et al. |
| 2013/0021968 | A1 | 1/2013 | Reznik et al. |
| 2013/0044764 | A1 | 2/2013 | Casado et al. |
| 2013/0051399 | A1 | 2/2013 | Zhang et al. |
| 2013/0124718 | A1 | 5/2013 | Griffith et al. |
| 2013/0124911 | A1 | 5/2013 | Griffith et al. |
| 2013/0124912 | A1 | 5/2013 | Griffith et al. |
| 2013/0128889 | A1 | 5/2013 | Mathur et al. |
| 2013/0173788 | A1 | 7/2013 | Song |
| 2013/0238782 | A1 | 9/2013 | Zhao et al. |
| 2013/0242718 | A1 | 9/2013 | Zhang |
| 2013/0254599 | A1 | 9/2013 | Katkar et al. |
| 2013/0258839 | A1 | 10/2013 | Wang et al. |
| 2013/0283364 | A1 | 10/2013 | Chang et al. |
| 2013/0301642 | A1 | 11/2013 | Radhakrishnan et al. |
| 2013/0329548 | A1 | 12/2013 | Nakil et al. |
| 2014/0019604 | A1 | 1/2014 | Twitchell, Jr. |
| 2014/0108665 | A1 | 4/2014 | Arora et al. |
| 2014/0156823 | A1 | 6/2014 | Liu et al. |
| 2014/0173113 | A1 | 6/2014 | Vemuri et al. |
| 2014/0219135 | A1 | 8/2014 | Li et al. |
| 2014/0223507 | A1 | 8/2014 | Xu |
| 2014/0244851 | A1 | 8/2014 | Lee |
| 2014/0317440 | A1 | 10/2014 | Biermayr et al. |
| 2015/0016249 | A1 | 1/2015 | Mukundan et al. |
| 2015/0029864 | A1 | 1/2015 | Raileanu et al. |
| 2015/0046572 | A1 | 2/2015 | Cheng |
| 2015/0096011 | A1 | 4/2015 | Watt |
| 2015/0172121 | A1 | 6/2015 | Farkas et al. |
| 2015/0188823 | A1 | 7/2015 | Williams et al. |
| 2015/0222543 | A1 | 8/2015 | Song |
| 2015/0236962 | A1 | 8/2015 | Veres et al. |
| 2015/0334696 | A1 | 11/2015 | Gu et al. |
| 2015/0350907 | A1 | 12/2015 | Timariu et al. |
| 2015/0363733 | A1 | 12/2015 | Brown |
| 2015/0372943 | A1 | 12/2015 | Hasan et al. |
| 2016/0072669 | A1 | 3/2016 | Saavedra |
| 2016/0142373 | A1 | 5/2016 | Ossipov |
| 2016/0164914 | A1 | 6/2016 | Madhav et al. |
| 2016/0197834 | A1 | 7/2016 | Luft |
| 2016/0197835 | A1 | 7/2016 | Luft |
| 2016/0198003 | A1 | 7/2016 | Luft |
| 2016/0210209 | A1 | 7/2016 | Verkaik et al. |
| 2016/0218947 | A1 | 7/2016 | Hughes et al. |
| 2016/0315912 | A1 | 10/2016 | Mayya et al. |
| 2016/0359738 | A1 | 12/2016 | Sullenberger et al. |
| 2017/0026283 | A1 | 1/2017 | Williams et al. |
| 2017/0034129 | A1 | 2/2017 | Sawant et al. |
| 2017/0053258 | A1 | 2/2017 | Carney et al. |
| 2017/0055131 | A1 | 2/2017 | Kong et al. |
| 2017/0064005 | A1 | 3/2017 | Lee |
| 2017/0123939 | A1 | 5/2017 | Maheshwari et al. |
| 2017/0126564 | A1 | 5/2017 | Mayya et al. |
| 2017/0134186 | A1 | 5/2017 | Mukundan et al. |
| 2017/0195169 | A1 | 7/2017 | Mills et al. |
| 2017/0201585 | A1 | 7/2017 | Doraiswamy et al. |
| 2017/0207976 | A1 | 7/2017 | Rovner et al. |
| 2017/0214701 | A1 | 7/2017 | Hasan |
| 2017/0223117 | A1 | 8/2017 | Messerli et al. |
| 2017/0237710 | A1 | 8/2017 | Mayya et al. |
| 2017/0257309 | A1 | 9/2017 | Appanna |

(56) References Cited

U.S. PATENT DOCUMENTS

| | | |
|---|---|---|
| 2017/0279717 A1 | 9/2017 | Bethers et al. |
| 2017/0310691 A1 | 10/2017 | Vasseur et al. |
| 2017/0317974 A1 | 11/2017 | Masurekar et al. |
| 2017/0339070 A1 | 11/2017 | Chang et al. |
| 2017/0364419 A1 | 12/2017 | Lo |
| 2018/0014051 A1 | 1/2018 | Phillips et al. |
| 2018/0034668 A1 | 2/2018 | Mayya et al. |
| 2018/0041425 A1 | 2/2018 | Zhang |
| 2018/0074909 A1 | 3/2018 | Bishop et al. |
| 2018/0084081 A1 | 3/2018 | Kuchibhotla et al. |
| 2018/0176082 A1 | 6/2018 | Katz et al. |
| 2018/0234300 A1 | 8/2018 | Mayya et al. |
| 2018/0270104 A1 | 9/2018 | Zheng et al. |
| 2018/0278541 A1 | 9/2018 | Wu et al. |
| 2018/0295529 A1 | 10/2018 | Jen et al. |
| 2018/0302286 A1 | 10/2018 | Mayya et al. |
| 2018/0351855 A1 | 12/2018 | Sood et al. |
| 2018/0375744 A1 | 12/2018 | Mayya et al. |
| 2019/0058709 A1 | 2/2019 | Kempf et al. |
| 2019/0075083 A1 | 3/2019 | Mayya et al. |
| 2019/0103990 A1 | 4/2019 | Cidon et al. |
| 2019/0103991 A1 | 4/2019 | Cidon et al. |
| 2019/0103992 A1 | 4/2019 | Cidon et al. |
| 2019/0103993 A1 | 4/2019 | Cidon et al. |
| 2019/0104035 A1 | 4/2019 | Cidon et al. |
| 2019/0104049 A1 | 4/2019 | Cidon et al. |
| 2019/0104050 A1 | 4/2019 | Cidon et al. |
| 2019/0104051 A1 | 4/2019 | Cidon et al. |
| 2019/0104052 A1 | 4/2019 | Cidon et al. |
| 2019/0104053 A1 | 4/2019 | Cidon et al. |
| 2019/0104063 A1 | 4/2019 | Cidon et al. |
| 2019/0104064 A1 | 4/2019 | Cidon et al. |
| 2019/0104109 A1 | 4/2019 | Cidon et al. |
| 2019/0104111 A1 | 4/2019 | Cidon et al. |
| 2019/0104413 A1 | 4/2019 | Cidon et al. |
| 2019/0140889 A1 | 5/2019 | Mayya et al. |
| 2019/0140890 A1 | 5/2019 | Mayya et al. |
| 2019/0158605 A1 | 5/2019 | Markuze et al. |

FOREIGN PATENT DOCUMENTS

| | | |
|---|---|---|
| WO | 2012167184 A2 | 12/2012 |
| WO | 2017083975 A1 | 5/2017 |
| WO | 2019070611 A1 | 4/2019 |
| WO | 2019094522 A1 | 5/2019 |

OTHER PUBLICATIONS

Non-Published commonly Owned U.S. Appl. No. 15/707,124, filed Sep. 18, 2017, 24 pages, Nicira, Inc.

Non-Published commonly Owned U.S. Appl. No. 15/784,404, filed Oct. 16, 2017, 21 pages, Nicira, Inc.

Non-Published commonly Owned U.S. Appl. No. 15/811,329, filed Nov. 13, 2017, 37 pages, Nicira, Inc.

Non-Published commonly Owned U.S. Appl. No. 15/838,052, filed Dec. 11, 2017, 28 pages, Nicira, Inc.

Non-Published commonly Owned U.S. Appl. No. 15/838,355, filed Dec. 11, 2017, 29 pages, Nicira, Inc.

Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.

* cited by examiner

METHOD AND SYSTEM OF RESILIENCY IN CLOUD-DELIVERED SD-WAN

CROSS-REFERENCE TO RELATED APPLICATIONS

This application claims priority to U.S. Provisional Application No. 62/523,477, titled and METHOD AND SYSTEM OF RESILIENCY AND VISIBILITY IN CLOUD-DELIVERED SD-WAN filed on 22 Jun. 2017. This provisional application is incorporated by reference in its entirety.

FIELD OF THE INVENTION

This application relates generally to computer networking, and more specifically to a system, article of manufacture and method of resiliency in cloud-delivered SD-WAN.

DESCRIPTION OF THE RELATED ART

Traditional methods of ensuring WAN resiliency have focused on two aspects. First, resiliency for traffic between two enterprise sites (not destined for the public Internet). Second, for subsequent flows towards the public Internet (not guaranteeing session continuity). The methods describe here provide for full resiliency for traffic destined for the public Internet including the preservation of existing flows.

BRIEF SUMMARY OF THE INVENTION

In one aspect, a computerized method includes the step of providing process monitor in a Gateway. The method includes the step of, with the process monitor, launching a Gateway Daemon (GWD). The GWD runs a GWD process that implements a Network Address Translation (NAT) process. The NAT process includes receiving a set of data packets from one or more Edge devices and forwarding the set of data packets to a public Internet. The method includes the step of receiving another set of data packets from the public Internet and forwarding the other set of data packets to the one or more Edge devices. The method includes the step of launching a Network Address Translation daemon (NATD). The method includes the step of detecting that the GWD process is interrupted; moving the NAT process to the NATD.

In another aspect, a computerized method is implemented when a public Internet flow is initiated from an Edge device connected to a Gateway system. The method includes the step of, with a GWD, looking up in a local hash table a NAT translation for a data packet's five tuple. The method includes the step of detecting that no NAT translation is extant for the data packet's five tuple. The method includes the step of creating the NAT translation for the data packet's five tuple. The method includes the step of creating returning the NAT translation for the data packet's five tuple to the Gateway system; storing the NAT translation locally in the Gateway system.

Figure 1:
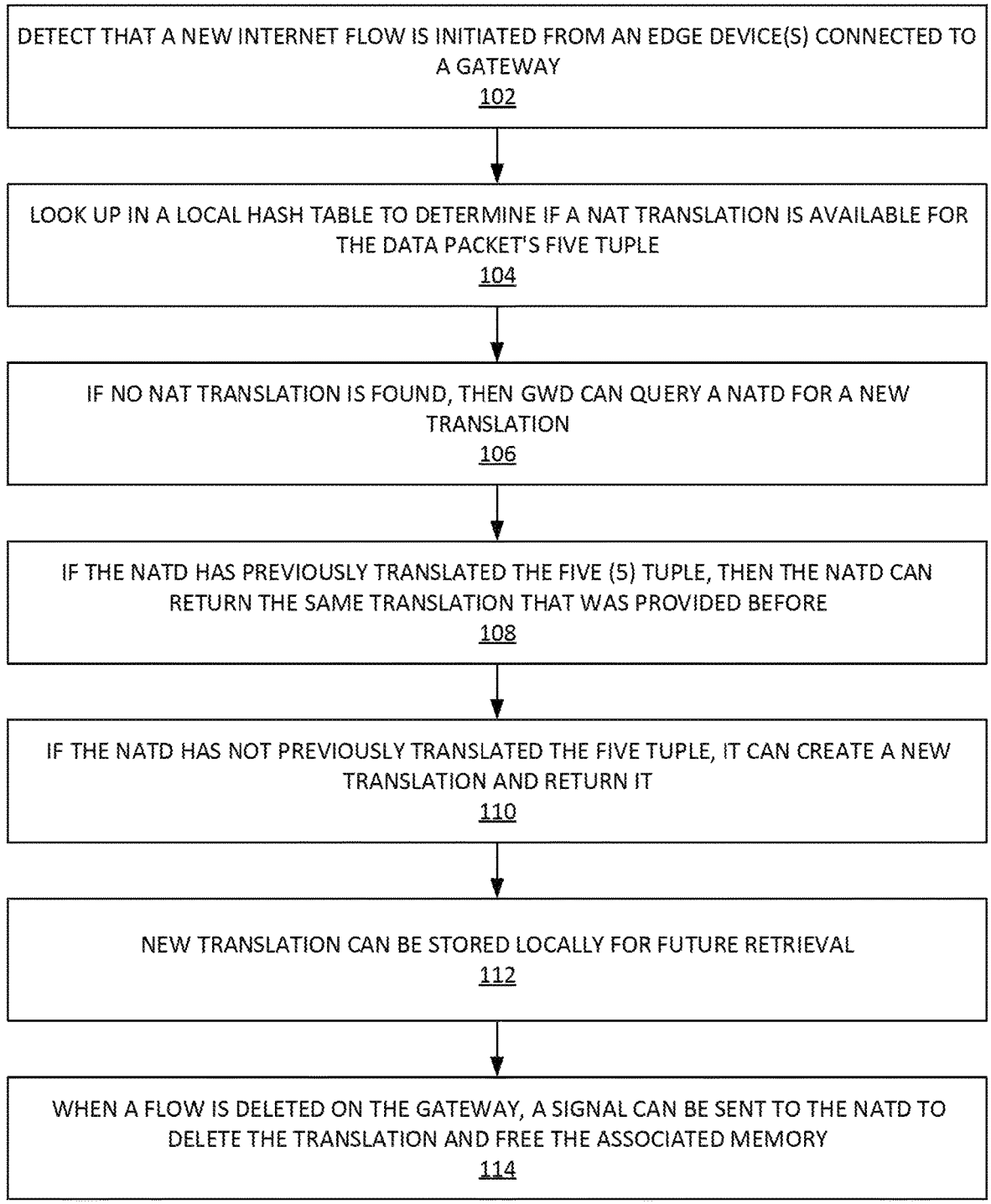
FIG. 1 illustrates an example process of implementing resiliency in an SD-WAN, according to some embodiments.

The Figures described above are a representative set, and are not exhaustive with respect to embodying the invention.

DESCRIPTION

Disclosed are a system, method, and article of manufacture for resiliency in cloud-delivered SD-WAN. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout, this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Border Gateway Protocol (BGP) can be a standardized exterior gateway protocol designed to exchange routing and reachability information among autonomous systems (AS) on the Internet.

Cloud computing can involve deploying groups of remote servers and/or software networks that allow centralized data storage and online access to computer services or resources. These groups of remote serves and/or software networks can be a collection of remote computing services.

Daemon can be a background process.

Data center, a physical location housing computing-related gear.

Dynamic tunneling is a transparent mechanism available for applications (e.g. that support the SOCKS4 or SOCKS5 client protocol).

Edge device can be a device that provides an entry point into enterprise or service provider core networks. An edge device can be software running in a virtual machine (VM) located in a branch office and/or customer premises.

Five (5) tuple refers to a set of five different values that comprise a Transmission Control Protocol/Internet Protocol (TCP/IP) connection. It includes a source IP address/port number, destination IP address/port number and the protocol in use.

Flow can be a grouping of packets that match a five (5) tuple which is a combination of Source IP Address (SIP), Destination IP Address (DIP), L4 Source Port (SPORT) and L4 Destination Port (DPORT) and the L4 protocol (PROTO).

Gateway can be a node (e.g. a router) on a computer network that serves as an access point to another network.

Internet Protocol Security (IPsec) can be a protocol suite for securing Internet Protocol (IP) communications by authenticating and encrypting each IP packet of a communication session. In IPsec tunnel mode, the entire IP packet is encrypted and authenticated. It is then encapsulated into a new IP packet with a new IP header. Tunnel mode is used to create virtual private networks for network-to-network communications (e.g. between routers to link sites), host-to-network communications (e.g. remote user access) and host-to-host communications (e.g. private chat).

Inter-process communication (IPC) can include mechanisms an operating system provides to allow the processes to manage shared data. Typically, applications can use IPC, categorized as clients and servers, where the client requests data and the server responds to client requests.

Network Address Translation (NAT) is a method of remapping one IP address space into another by modifying network address information in Internet Protocol (IP) datagram packet headers while they are in transit across a traffic routing device.

Orchestrator can include a software component that provides multi-tenant and role based centralized configuration management and visibility.

Open Shortest Path First (OSPF) can be a routing protocol for Internet Protocol (IP) networks. OSPF can use a link state routing (LSR) algorithm and falls into the group of interior gateway protocols (IGPs), operating within a single autonomous system (AS).

Software-defined networking in a wide area network (SD-WAN) a specific application of software-defined networking (SDN) technology applied to WAN connections, which are used to connect enterprise networks, including branch offices and data centers—over large geographic distances. An SD-WAN can simplify the management and operation of a WAN by decoupling the networking hardware from its control mechanism.

Tunneling protocol can allow a network, user to access or provide a network service that the underlying network does not support or provide directly.

Virtual private network (VPN) can extend a private network across a public network, such as the Internet. It can enable users to send and receive data across shared or public networks as if their computing devices were directly connected to the private network, and thus benefit from the functionality, security and management policies of the private network.

Additional example definitions are provided herein.

Examples Methods

FIG. 1 illustrates an example process of implementing resiliency in an SD-WAN, according to some embodiments. In step 102, it can be detected that a new Internet flow is initiated from an Edge device(s) connected to a Gateway. In step 104, a gateway data daemon (GWD) can look up in a local hash table to determine if a NAT translation is available for the data packet's five tuple. If no NAT translation is found, then, step 106, the GWD can query a Network Address Translation Daemon (NATD) for a new translation. If the NATD has previously translated the five (5) tuple, then, in step 108, the NATD can return the same translation that was provided before, thus ensuring session continuity. If the NATD has not previously translated the five tuple, in step 110, it can create a new translation and return it. In step 112, the new translation can be stored locally for future retrieval. When a flow is deleted on the Gateway, a signal can be sent to the NATD to delete the translation and free the associated memory in step 114.

Example Systems

Figure 2:
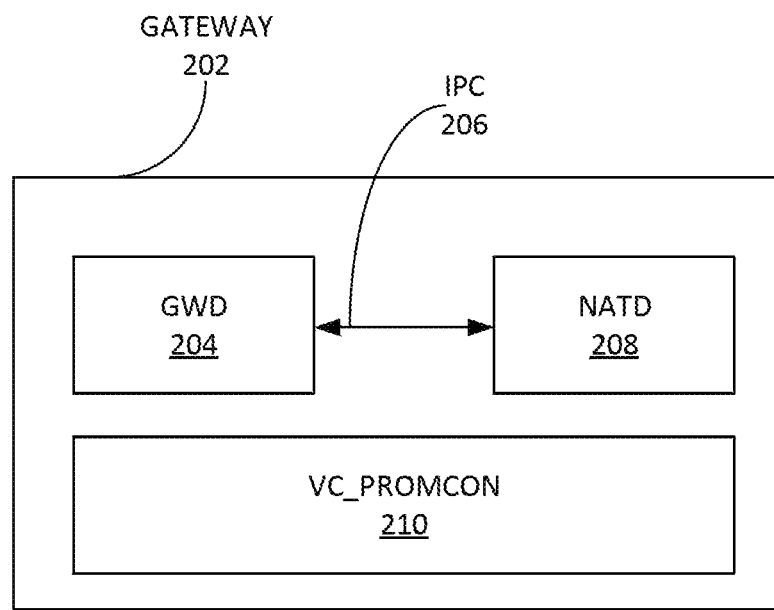
FIG. 2 illustrates an example of a gateway data plane running in a GWD process, according to some embodiments.

FIG. 2 illustrates an example system 200 of a GWD 202 running in a GWD process 204, according to some embodiments. It is noted that GWD 202 can be a daemon. GWD process 204 can be a user-space process running in Linux. In one example, GWD can include a data plane (e.g. Velo-Cloud® data plane, etc.) and control plane software.

It is noted that the data plane includes the forwarding information base (FIB) and mechanisms for transmitting packets. The control plane includes the routing information base (RIB) and mechanisms for instructing Edges how to transmit packets.

In a single device case, GWD can run in a GWD process 204. GWD process 204 can receive data packets (e.g. all data packets) from the various Edge devices and forward them to the Internet, and vice versa. GWD process 204 can be interrupted for multiple reasons. For example, GWD process 204 can encounter a software fault (e.g. a crash). GWD process 204 can be restarted for troubleshooting. GWD process 204 can be restarted as part of a routine software upgrade. In these scenarios, data traffic can continue to flow uninterrupted. This can be achieved by moving the NAT process and its associated state outside the GWD context (e.g. to NATD 208). Accordingly, FIG. 2 illustrates a simplified process diagram of processes running within the Gateway 202. The process monitor (e.g. vc_procmon 210) can launch and manage two separate services independently: GWD and NATD 208. NATD 208 can be a user-space process running in Linux which contains the NAT software (e.g. VeloCloud® NAT software, etc.). NATD 208 stores its own state and communicates via IPC with GWD.

When a new Internet flow is initiated from one of the Edge devices connected to Gateway 202 the following steps can be implemented. In one step, GWD can look up in a local hash table to see if a NAT translation is available for the packet's five tuple. If no NAT translation is found, then GWD queries NATD 208 for a new translation. If NATD 208 has previously translated the five (5) tuple, then NATD can return the same translation that was provided before, ensuring session continuity. If NATD 208 has not previously translated the five tuple, it can create a new translation and return it. The new translation can be stored locally for future retrieval. When a flow is deleted on Gateway 202, a signal can be sent to NATD 208 to delete the translation and free the associated memory.

Figure 3:
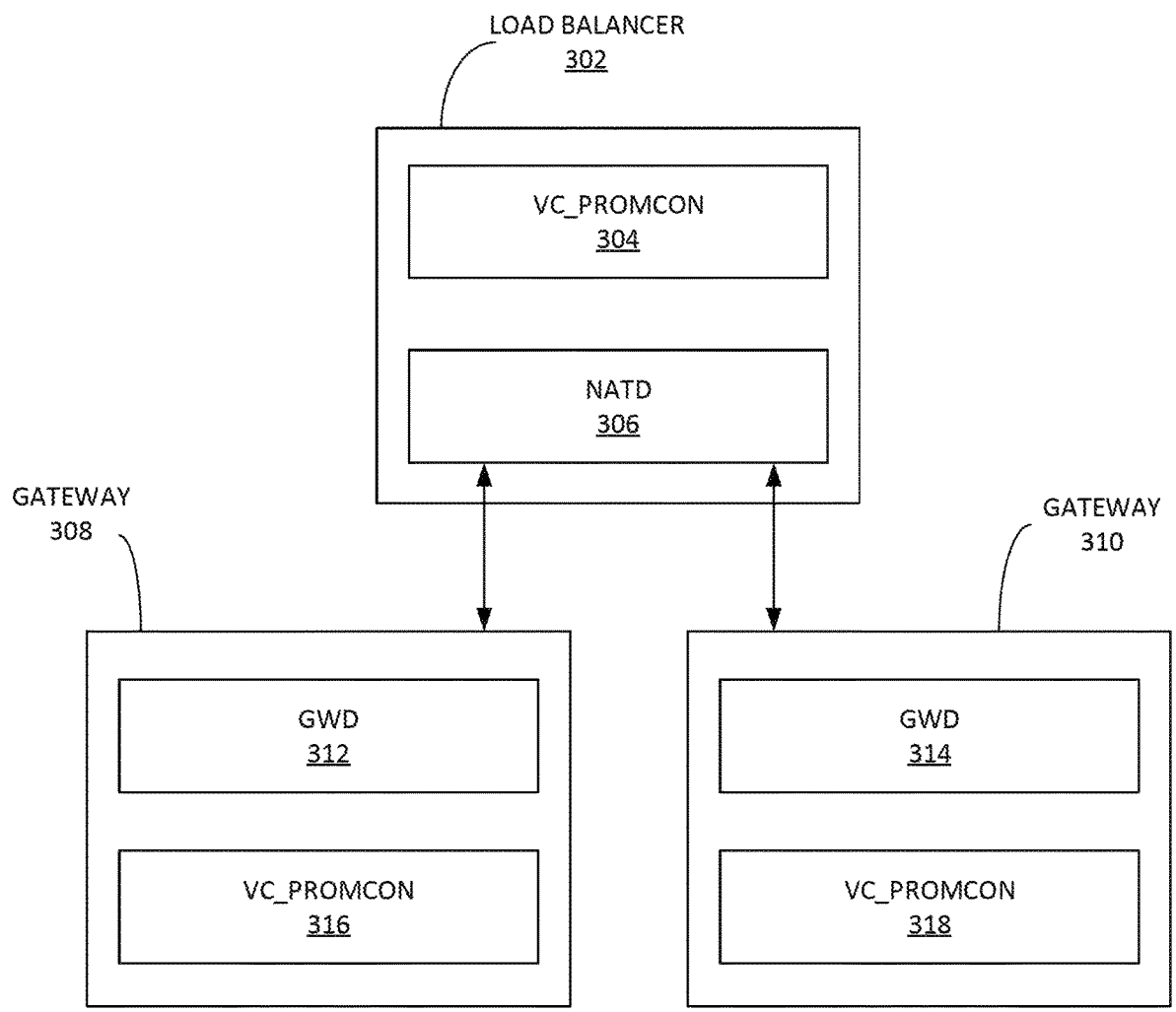
FIG. 3 illustrates an example of multiple physical or virtual instances of the gateway running and fronted by a single NATD daemon, according to some embodiments.

FIG. 3 illustrates an example system 300 of multiple physical or virtual instances of one more gateways 308 and 310 running and fronted by a single NATD daemon 306, according to some embodiments. This can allow for horizontal scaling of resources to provide internet connectivity from a larger number of branch devices. NATD daemon 306 can be implemented in load balancer 302. A process monitor (e.g. vc_procmon 304, 316, and 318) can launch and manage associated services (e.g. GWD 312 and 314, NATD daemon 306). In this scenario, the same NATD instance provides resiliency for NAT translations to multiple GWD instances using the same steps defined above.

It is noted that, in some embodiments, a single instance of the gateway (GWD) can have a finite number of Edge devices that can connect to it before it runs out of resources. In order to expand scale beyond this limit, a cluster of multiple gateway instances can be created and load can be distributed across those instances. These instances can share a single NATD to ensure that even if load is moved from one gateway instance to another, the session continuity is maintained.

Figure 4:
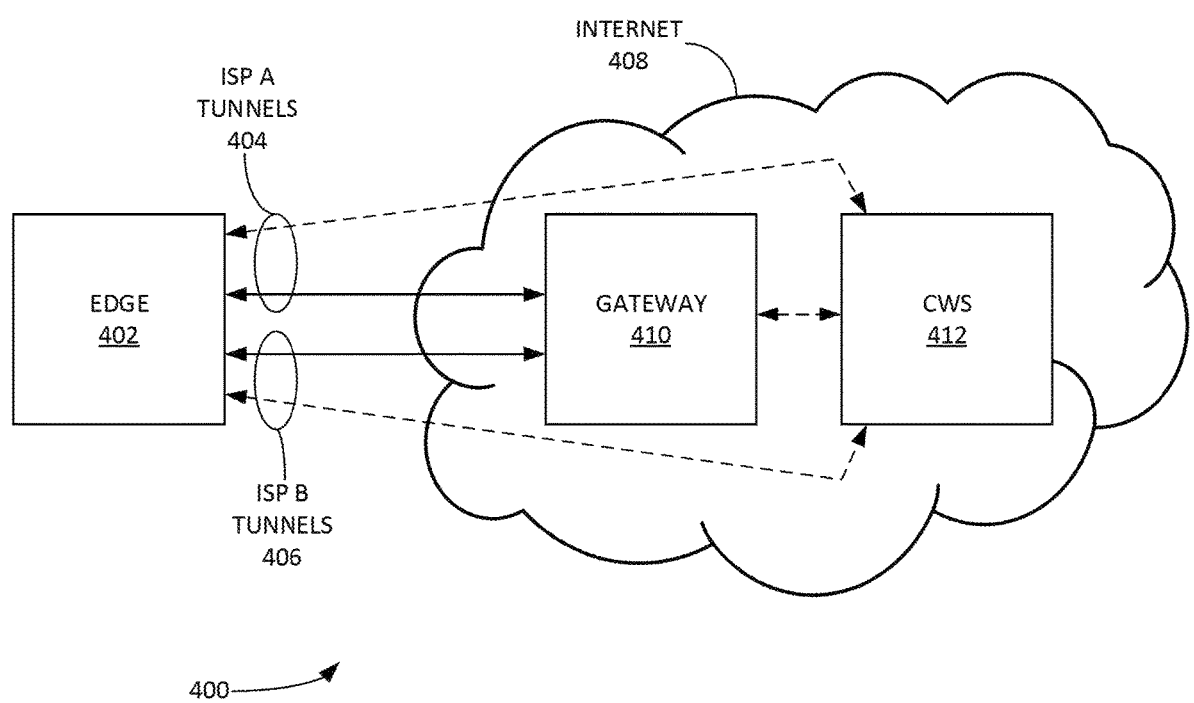
FIG. 4 illustrates an example of cloud traffic can be routed through an external CWS service to enable security scanning and other service insertion on the traffic before it exits to the public internet, according to some embodiments.

FIG. 4 illustrates an example of cloud traffic routed through an external Cloud Web Security (CWS) service to enable security scanning and other service insertion on the traffic before it exits to the public Internet, according to some embodiments. In this scenario, the same NATD instance provides resiliency for NAT translations to multiple GWD instances using the same steps provided supra. In addition to routing traffic via the cloud gateway 410, cloud traffic can be routed through an external Cloud Web Security (CWS) 412 service to enable security scanning and other service insertion on the traffic before it exits to the public Internet. There are two mechanisms provided for connecting to the cloud service, via an aggregated IPsec tunnel through Gateway 410 and via an IPsec tunnel direct from the Edge 402 itself. By tracking the state of various connectivity points, this provides full redundancy for internet traffic even if any one of the tunnels fails.

Figure 5:
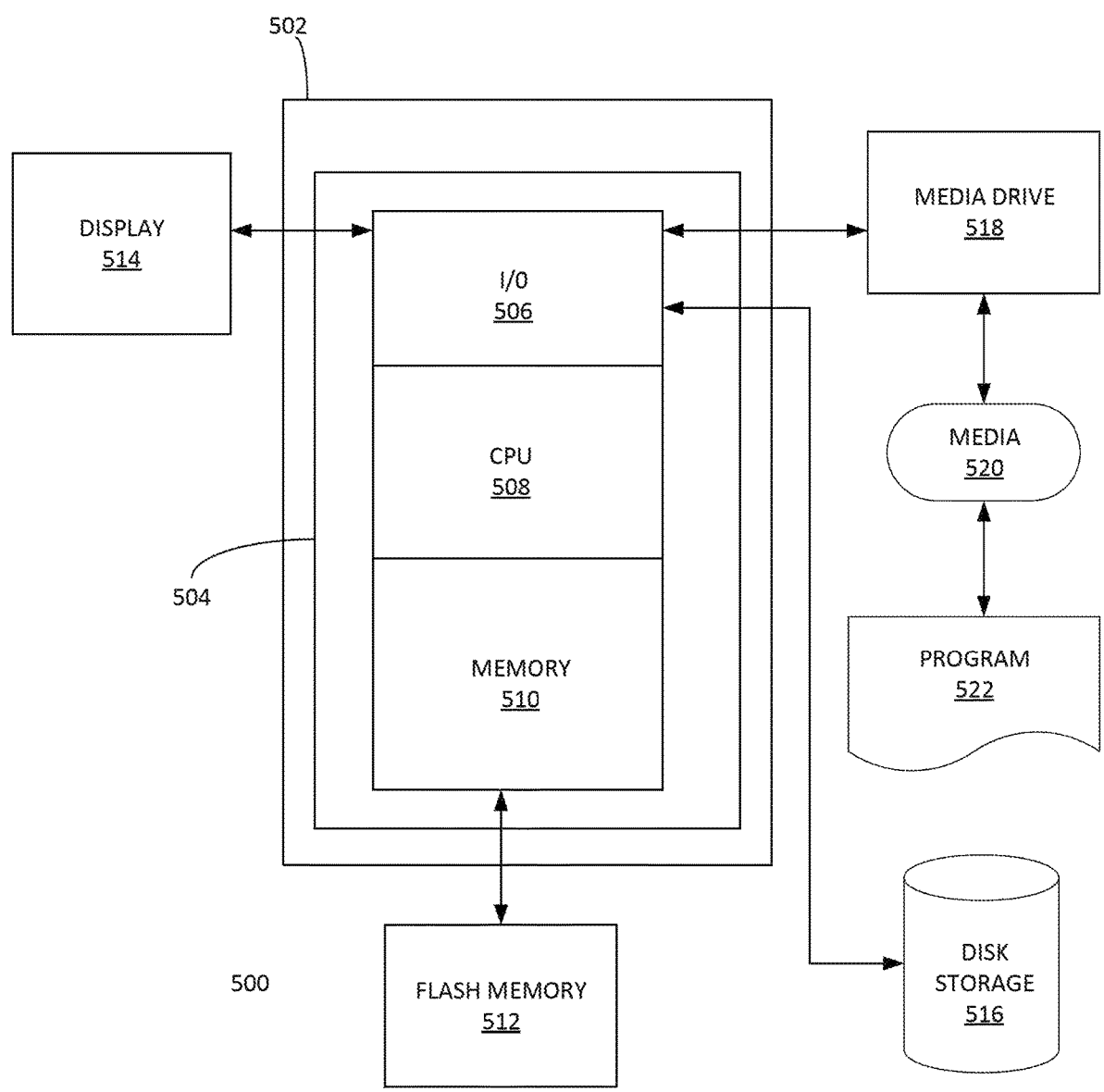
FIG. 5 depicts an exemplary computing system that can be configured to perform any one of the processes provided herein.

There can be three tunnels established in the topology of FIG. 5 which enable the Edge 402 to reach the CWS 412 service. This tunnel is from the Gateway 410 to the CWS 412 service. This tunnel is established per Gateway 410 and one or more edges are assigned to this tunnel via profile, allowing edges to take advantage of the Edge-Gateway Multipath Method and ensure traffic resiliency in reaching the Gateway 410. This tunnel is established from the Edge directly to the CWS 412 service over ISP A 404. This tunnel is established from the Edge directly to the CWS 412 service over ISP B 406. Edge 402 is able to dynamically shift traffic per-packet over the optimal tunnel based on continuous measurement of tunnel state, latency, traffic priority, congestion, etc.

A variety of techniques can be used to maintain branch connectivity to data centers, cloud applications, etc. For example, in a data center topology, an edge device (e.g. an edge) can be deployed in two different ways. As a cluster, redundancy can be provided for a single data center leveraging multiple independent devices. Alternately, redundancy can be provided by deploying multiple physical edges in multiple data centers that are interconnected via routing external to a gateway. In the clustering topology, each edge in a cluster can report health statistics to a gateway at a specified period (e.g. every 30 seconds, etc.). This can enable it to make intelligent decisions about assignment and re-balancing.

Link Resiliency is now discussed. For resiliency of the individual links, multiple modes are provided. The method can include an Edge-Gateway Multipath Method where both links are considered active. In this topology, the reactivity time for blackout or brownout conditions is three hundred (300) ms and approximate bandwidth consumption on the second link is one thousand two-hundred and fifty (1250) MB per month.

Two additional modes can be provided which reduce the reactivity time but save on bandwidth consumption. The first mode provided is a pure backup mode, wherein tunnels are not established on the WAN link and ICMP probes alone are used to monitor link states. The link is still included in the link state machine tracking availability to determine availability for failover. This availability is reported as status on an Orchestrator and used to generate link up/down alerts though tunnels are not active. In this mode, usage is only twenty (20) MB per month but it may take up to two (2) seconds for the link to take over in case of blackout of the primary link and there is no brownout protection.

In a second mode, the link can be maintained in a "hot standby" mode wherein the tunnels are active however all MP control traffic is not sent across the link. In this mode, reactivity time can be seven-hundred milliseconds (700 ms) for blackout or brownout conditions and the usage is approximately two-hundred and fifty (250) MB per month.

Various cloud resiliency examples are now discussed. For cloud traffic, it can be that traffic continuity is maintained through a single peering, point due to NAT. However, the resiliency methods described above (e.g. multiple devices) can also be applicable to cloud traffic. Because sessions are translated to a given public Internet Protocol (IP) address, resiliency that utilizes multiple devices and instead resiliency behind a single NAT IP address is important. In this regard, the Gateway has the ability to provide resilient connectivity in a single or multi-device topology while preserving NAT state.

Figure 6:
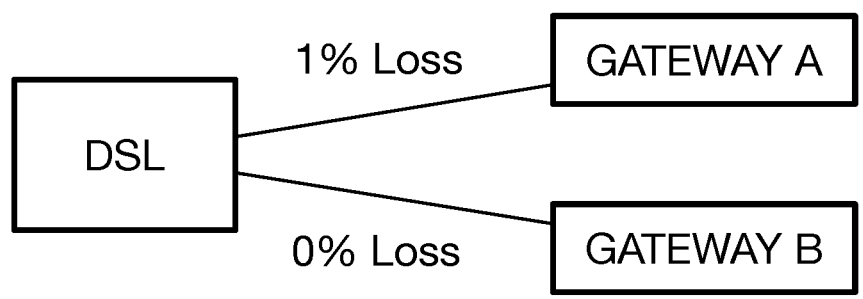
FIG. 6 conceptually illustrates an example of a single DSL connected to two gateways, according to some embodiments.

Quality of Experience Visibility is now discussed. FIG. 6 illustrates an example of a single DSL connected to two gateways, according to some embodiments. The path and link state machines will establish a set of flags to determine the eligibility of the path and link to meet scheduling criteria for the various traffic types. The path eligibility is used for path selection. The link eligibility is used for event reporting. Consider the case where there is a single DSL connected to two gateways "A" and "B". There can be one link and two paths. Path DSL→A has 1% loss, Path DSL→B has 0% loss.

During path selection, Path DSL→A as REALTIME_VOICE_RED and Path DSL→B as REALTIME_VOICE_GREEN can be provided. Traffic to Gateway A can avoid this link while traffic to Gateway B would not.

However, an event may not be generated because the issue is on the DSL→A path itself and does not appear to be local to the user's link. This abstracts the network (e.g. a Velocloud® network, etc.) problems from the user.

For a path, these flags are set based on the path statistics. For a link, these flags are set based on the statistics of the best path that is part of the link. This allows VeloCloud to report on the quality of the link irrespective of issues that may occur in the last mile of VeloCloud Gateway devices, as multiple gateways can provide for multiple data points that may be used to reflect quality.

Latency Eligibility Flags can be provided as follows:
REALTIME_VOICE_YELLOW if the average latency is >n ms.
REALTIME_VOICE_RED if the average latency is >n ms.
REALTIME_VIDEO_YELLOW if the average latency is >n ms.
REALTIME_VIDEO_RED if the average latency is >n ms.
TRANSACTIONAL_YELLOW if the average latency is >n ms.
TRANSACTIONAL_RED if the average latency is >n ms.

Jitter Eligibility Flags can be provided as follows:
REALTIME_VOICE_YELLOW if the average jitter is >n ms.
REALTIME_VOICE_RED if the average jitter is >n ms.
REALTIME_VIDEO_YELLOW if the jitter is >n ms.
REALTIME_VIDEO_RED if the jitter is >n ms.
TRANSACTIONAL_YELLOW if the jitter is >n ms.
TRANSACTIONAL_RED if the jitter is >n ms.

Loss Eligibility Flags can be provided as follows:
REALTIME_VOICE_YELLOW if the loss is >n %.
REALTIME_VOICE_RED if the loss is >n %.
REALTIME_VIDEO_YELLOW if the loss is >n %.
REALTIME_VIDEO_RED if the loss is >n %.
TRANSACTIONAL_YELLOW if the loss is >n %.
TRANSACTIONAL_RED if the less is >n %.

Path Selection methods are now discussed. During path selection, each packet can first check for the path with the lowest score that meet the jitter and loss eligibility criteria outlined for the traffic type of the flow selecting the path. For example, on the first selection of a real-time packet the check might be:

if ((jitter_flags & REALTIME_VOICE_RED)||
(loss_flags & REALTIME_VOICE_RED))
continue;

If all the paths fail, the path with the lowest score can be chosen with the appropriate flags noted. If there are multiple eligible path the following steps can be implemented. A "fixed" path select can select the lowest score eligible path and stick to it. A "replicate" path select can send on the best scoring path for each packet and only start replicating if loss becomes an issue. A "load-balance" path select can select the best scoring path for each packet, eventually using all the eligible path if the load is high enough.

Aspects of jitter are now discussed. If an eligible path is found, the flow can select the path with jitter correction disabled. If no eligible paths are found, it can fall back to traditional path selection with jitter correction enabled. A flag can be set in the header indicating to the receive side to enable the jitter buffer. Once enabled for a flow, the jitter buffer will remain in place for the life of the flow, regardless of whether the situation clears.

Aspects of loss are now discussed. If eligible paths are found, the flow can select the path with loss correction disabled. If no eligible paths are found, it can fall back to traditional path selection with loss correction enabled. This means that loss correction state will be toggled dynamically on a per-packet basis based on the latest network conditions.

Aspects of event generation are now discussed. The link state machine can check if the above conditions are met and set/clear flags appropriately. Network events can be generated when the flags are set or cleared. The Orchestrator can display a summary chart of the quality of the link as measured and also the estimated quality once VeloCloud Error Corrections are applied. The target metrics for voice, video, transactional and bulk traffic can be measured separately and are user-configurable with recommended values. These can be used to generate a VeloCloud Quality Score (VQS) and color-coded chart as follows:

For the "before" state:
Good ("Green"): all metrics are better than the objective (obj) thresholds App. SLA met/exceeded
Fair ("Yellow"): Some or all metrics are between the objective (obj) and maximum (max) values—App. SLA is partially met
Poor ("Red"): some or all metrics have reached or exceeded the maximum (max) value—Application SLA is not met For the "after" state:
Green: Best link meets the objective threshold or best link is yellow but can be corrected to green
Yellow: Best link does not meet the objective threshold and is yellow or best link is red but can be corrected to yellow
Red: Best link does not meet the objective threshold (is red), and cannot be corrected An example VQS Calculation can be as follows:

VQS: Velocloud Quality Score=10*(% of time link was Green)+5*(% of time link was Yellow)+ 0*(% of time link was Red).

Additional Exemplary Computer Architecture and Systems

FIG. 5 depicts an exemplary computing system 500 that can be configured to perform any one of the processes provided herein. In this context, computing system 500 may include, for example, a processor, memory, storage, and I/O devices (e.g., monitor, keyboard, disk drive, Internet connection, etc.). However, computing system 500 may include circuitry or other specialized hardware for carrying out some or all aspects of the processes. In some operational settings, computing system 500 may be configured as a system that includes one or more units, each of which is configured to carry out some aspects of the processes either in software, hardware, or some combination thereof.

FIG. 5 depicts computing system 500 with a number of components that may be used to perform any of the processes described herein. The main system 502 includes a motherboard 504 having an I/O section 506, one or more central processing units (CPU) 508, and a memory section 510, which may have a flash memory card 512 related to it. The I/O section 506 can be connected to a display 514, a keyboard and/or other user input (not shown), a disk storage unit 516, and a media drive unit 518. The media drive unit 518 can read/write a computer-readable medium 520, which can contain programs 522 and/or data. Computing system 500 can include a web browser. Moreover, it is noted that computing system 500 can be configured to include additional systems in order to fulfill various functionalities. Computing system 500 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A system comprising:
   a first device at an edge of a branch first network;
   a second device operating as an access point to a second network; and
   at least two links between the first device and the second device, wherein (i) a tunnel is established on an active first link of the at least two links, (ii) no tunnel is established on a backup second link of the at least two links, and (iii) probe packets are used to monitor a state of the backup second link in order to ensure that the second link can become active when needed to replace the first link;
   wherein if the first link becomes inactive, a second tunnel is established on the second link and the second link becomes the active link.

2. The system of claim 1, wherein the first device is an edge device and the second device is a gateway device.

3. The system of claim 1 further comprising a cloud web security service in the second network.

4. The system of claim 3, wherein the cloud web security service performs security scanning for data traffic from the enterprise first network prior to the data traffic being sent to the public Internet.

5. The system of claim 3, wherein the cloud web security service performs service insertion for data traffic from the enterprise first network prior to the data traffic being sent to the public Internet.

6. The system of claim 3 further comprising a tunnel from the second device to the cloud web service.

7. The system of claim 1, wherein the second device performs network address translation for data traffic sent from the first device to the second network.

8. The system of claim 1, wherein the probe packets are ICMP probe packets.

9. The system of claim 1, wherein states of the active first link and the backup second link are both included in a link state machine.

10. The system of claim 9, wherein the link state machine determines availability of links for failover.

11. The system of claim 10, wherein the availability is reported as a link status by a centralized configuration and management application.

12. The system of claim 9, wherein the link state machine establishes a set of flags to determine eligibility of the links.

13. The system of claim 1, wherein using probe packets without an established tunnel on the backup second link saves bandwidth consumption on the second link.

14. The system of claim 1, wherein the first device executes in a virtual machine located in a branch office.

15. The system of claim 1, wherein the first link uses a first Internet service provider and the second link uses a second Internet service provider.

16. A system comprising:
   a first device at an edge of a branch location of an enterprise network;
   a second device operating as an access point to a public cloud network; and
   at least two links between the first device and the second device, wherein (i) a tunnel is established on an active first link of the at least two links, (ii) no tunnel is established on an inactive backup second link of the at least two links, and (iii) probe packets are used to monitor a state of the inactive backup second link in order to ensure that the second link can become active when needed to replace the first link;
   wherein if the first link becomes inactive, a second tunnel is established on the second link and the second link becomes the active link.

17. The system of claim 16, wherein the first device is an edge device and the second device is a gateway device.

18. The system of claim 16, wherein using probe packets without an established tunnel on the backup second link saves bandwidth consumption on the second link.

* * * * *